United States Patent
Hiramatsu et al.

(10) Patent No.: US 10,112,602 B2
(45) Date of Patent: Oct. 30, 2018

(54) DRIVING SYSTEM FOR VEHICLE

(71) Applicant: HONDA MOTOR CO., LTD., Tokyo (JP)

(72) Inventors: Nobuyuki Hiramatsu, Wako (JP); Shigeru Nakayama, Wako (JP); Keiichi Ooiso, Wako (JP); Takabumi Suzuki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 440 days.

(21) Appl. No.: 14/892,418

(22) PCT Filed: Dec. 22, 2014

(86) PCT No.: PCT/JP2014/083922
§ 371 (c)(1),
(2) Date: Nov. 19, 2015

(87) PCT Pub. No.: WO2015/098846
PCT Pub. Date: Jul. 2, 2015

(65) Prior Publication Data
US 2016/0090082 A1 Mar. 31, 2016

(30) Foreign Application Priority Data
Dec. 24, 2013 (JP) .................... 2013-265802

(51) Int. Cl.
*B60K 17/356* (2006.01)
*B60W 20/40* (2016.01)
(Continued)

(52) U.S. Cl.
CPC ............... *B60W 20/40* (2013.01); *B60K 1/02* (2013.01); *B60K 6/387* (2013.01); *B60K 6/448* (2013.01);
(Continued)

(58) Field of Classification Search
CPC ...... B60K 6/52; B60K 17/356; B60K 17/046; F16D 48/06; F16H 48/10
See application file for complete search history.

(56) References Cited

U.S. PATENT DOCUMENTS

| 5,016,724 A | 5/1991 | Steinhagen et al. |
| 2012/0143426 A1 | 6/2012 | Yamamoto et al. |

(Continued)

FOREIGN PATENT DOCUMENTS

| CN | 102470764 A | 5/2012 |
| CN | 103079868 A | 5/2013 |

(Continued)

OTHER PUBLICATIONS

Office Action dated May 18, 2017, issued in counterpart Chinese Application No. 201480068618.X, with English translation. (9 pages).

(Continued)

*Primary Examiner* — Erin D Bishop
(74) *Attorney, Agent, or Firm* — Westerman, Hattori, Daniels & Adrian, LLP

(57) ABSTRACT

A driving system for a vehicle includes a drive source, a driven portion, a wet multiple disc connection/disconnection unit provided on a power transmission path between the drive source and the driven portion, and a connection/disconnection unit controller configured to control a release and an application of the connection/disconnection unit, wherein the driving system further includes a time counter configured to obtain a continuous applied time that is an elapsed time from a start of a latest application of the connection/disconnection unit.

8 Claims, 12 Drawing Sheets

(51) Int. Cl.
| | |
|---|---|
| B60K 6/52 | (2007.10) |
| B60K 6/448 | (2007.10) |
| B60K 7/00 | (2006.01) |
| B60K 17/04 | (2006.01) |
| B60K 6/387 | (2007.10) |
| B60K 17/34 | (2006.01) |
| B60W 10/02 | (2006.01) |
| B60W 10/06 | (2006.01) |
| B60W 10/08 | (2006.01) |
| B60W 10/184 | (2012.01) |
| F16D 43/02 | (2006.01) |
| F16D 48/06 | (2006.01) |
| B60K 1/02 | (2006.01) |

(52) U.S. Cl.
CPC .............. *B60K 6/52* (2013.01); *B60K 7/0007* (2013.01); *B60K 17/046* (2013.01); *B60K 17/34* (2013.01); *B60K 17/356* (2013.01); *B60W 10/02* (2013.01); *B60W 10/06* (2013.01); *B60W 10/08* (2013.01); *B60W 10/184* (2013.01); *F16D 43/02* (2013.01); *F16D 48/06* (2013.01); *B60K 2007/0046* (2013.01); *B60K 2007/0092* (2013.01); *B60W 2510/0208* (2013.01); *B60W 2520/04* (2013.01); *B60W 2710/021* (2013.01); *B60W 2710/0677* (2013.01); *B60Y 2200/92* (2013.01); *B60Y 2400/427* (2013.01); *B60Y 2400/4244* (2013.01); *B60Y 2400/73* (2013.01); *F16D 2500/1066* (2013.01); *F16D 2500/10493* (2013.01); *F16D 2500/3067* (2013.01); *Y02T 10/6243* (2013.01); *Y02T 10/6265* (2013.01); *Y10S 903/93* (2013.01)

(56) References Cited

U.S. PATENT DOCUMENTS

| | | |
|---|---|---|
| 2013/0165293 A1 | 6/2013 | Shinohara et al. |
| 2013/0178320 A1 | 7/2013 | Suzuki et al. |
| 2013/0310217 A1 | 11/2013 | Terakawa et al. |

FOREIGN PATENT DOCUMENTS

| | | |
|---|---|---|
| CN | 103171430 A | 6/2013 |
| CN | 103380038 A | 10/2013 |
| EP | 0 237 147 A1 | 9/1987 |
| EP | 2 460 683 A1 | 6/2012 |
| EP | 2 623 356 A1 | 8/2013 |
| JP | 8-291860 A | 11/1996 |
| JP | H09-229183 A | 9/1997 |
| JP | 2000-247158 A | 9/2000 |
| JP | 2002-257225 A | 9/2002 |
| JP | 2003-21175 A | 1/2003 |
| JP | 2003-130092 A | 5/2003 |
| JP | 2012-47202 A | 3/2012 |
| JP | 2012-50315 A | 3/2012 |
| JP | 2012-215270 A | 11/2012 |
| JP | 2013-136277 A | 7/2013 |

OTHER PUBLICATIONS

Extended (supplementary) European Search Report dated Aug. 1, 2017, issued in counterpart European Application No. 14874417.0. (9 pages).

International Search Report dated Apr. 7, 2015, issued in counterpart application No. PCT/JP2014/083922 (2 pages).

| VEHICLE STATES | FRONT UNIT | REAR UNIT | REAR MOTOR | OWC | BRK |
|---|---|---|---|---|---|
| STOPPED | × | × | STOP | OFF | OFF |
| FORWARD TRAVEL AT LOW VEHICLE SPEEDS | × | ○ | POWER RUNNING DRIVE | ON | ON (WEAKLY APPLIED) |
| FORWARD TRAVEL AT MIDDLE VEHICLE SPEEDS | ○ | × | STOP | OFF | ON (WEAKLY APPLIED) |
| REGENERATIVE DECELERATION | ○ | ○ | REGENERATIVE DRIVE | OFF | ON |
| ACCELERATION | ○ | ○ | POWER RUNNING DRIVE | ON | ON (WEAKLY APPLIED) |
| FORWARD TRAVEL AT HIGH VEHICLE SPEEDS (WITH NO DRIVE REQUEST) | ○ | × | STOP | OFF | OFF |
| REVERSED | × | ○ | REVERSE POWER RUNNING DRIVE | OFF | ON |

FIG. 4

DRIVING SYSTEM FOR VEHICLE

TECHNICAL FIELD

The present invention relates to a driving system for a vehicle in which a connection/disconnection unit is provided on a power transmission path between a drive source and a driven portion.

BACKGROUND ART

Patent Literature 1 describes a wheeled vehicle driving system that includes a left wheel driving system having a first motor configured to drive a left wheel of a wheeled vehicle and a first planetary gear type speed changer provided on a power transmission path between the first motor and the left Wheel and a right Wheel driving system having a second motor configured to drive a right wheel of the Wheeled vehicle and a secondary planetary gear type speed changer provided on a power transmission path between the second motor and the right wheel. In the first and second planetary gear type speed changers, the first and second motors are connected to sun gears respectively; the left wheel and the right wheel are connected to planetary carriers respectively, and ring gears are connected to each other. A brake and a one-way clutch are provided on the ring gears that are connected together. The brake brakes the rotation of the ring gear by releasing or fastening the ring gear. The one-way clutch is engaged when the rotational power of the motors side in one direction is inputted into the wheels side, is disengaged when the rotational power of the motors side in the other direction is inputted into the wheels side. The one-way clutch is disengaged when the rotational power of the wheels side in one direction is inputted into the motors side and is engaged when the rotational power of the wheels side in the other direction is inputted into the motors side.

It is described that in the wheeled vehicle driving system, when the rotational power of the motors side in the one direction is inputted into the wheels side, the brake is applied so that the motors and the wheels are put in a connected state and that when the vehicle speed reaches or exceeds a predetermined speed with the motors and the wheels being in the connected state, the brake applied is then released.

PRIOR ART LITERATURE

Patent Literature

Patent Literature 1: JP-A-2012-50315

SUMMARY OF THE INVENTION

Problem That the Invention is to Solve

In the wheeled vehicle driving system described in Patent Literature 1, there is a possibility that the brake is kept applied for a long period of time in such a situation that the wheeled vehicle cruises at a vehicle speed that is slower than the predetermined speed. Even in such a case, the conditions of the connection/disconnection unit need to be grasped so that the connection/disconnection unit is protected appropriately.

The invention provides a driving system for a vehicle that can protect a connection/disconnection unit appropriately.

Means for Solving the Problem

The invention provides the following aspects.

A first aspect is characterized in a driving system a rear Wheel driving system 1 in embodiment) for a vehicle, including:

a drive source (e.g., a first and second motors 2A, 2B in embodiment);

a driven portion (e.g., rear wheels Wr in embodiment), which is driven by the drive source to propel the vehicle (e.g., a wheeled vehicle 3 in embodiment):

a wet multiple disc connection/disconnection unit (e.g., a hydraulic brake 60 in embodiment), which is provided on a power transmission path between the drive source and the driven portion, and which is configured to put the power transmission. path in a disconnected state or in a connected state by being released or applied; and a connection/disconnection unit controller (e.g., a controller 8 in embodiment), which is configured to control a release and an application of the connection/disconnection unit, wherein the driving system further includes a time counter, which is configured to obtain a continuous applied time that is an elapsed time from a start of a latest application of the connection/disconnection unit.

In addition to the configuration described in the first aspect, a second aspect is characterized in that the connection/disconnection unit controller releases the connection/disconnection unit when the continuous applied time obtained by the time counter is equal to or greater than a predetermined time.

In addition to the configuration described in the second aspect, a third aspect is characterized in that the driving system further comprises a unidirectional power transmitting unit (e.g., a one-way clutch 50 in embodiment), which is provided in parallel to the connection/disconnection unit on the power transmission path between the drive source and the driven portion, and Which is configured so that the unidirectional power transmitting unit is engaged when a rotational power of a drive source side in one direction is inputted into a driven portion side, is disengaged when a rotational power of the drive source side in the other direction is inputted into the driven portion side, is disengaged when a rotational power of the driven portion side in the one direction is inputted into the drive source side, and is engaged when a rotational power of the driven portion side in the other direction is inputted into the drive source side, and when the continuous applied time obtained by the time counter is equal to or greater than the predetermined time in a case of the drive source generating the rotational power in the one direction, the connection/disconnection unit controller waits to release the connection/disconnection unit until the rotational power in the one direction becomes substantially zero.

In addition to the configuration described in the second aspect, a fourth aspect is characterized in that the driving system further comprises a unidirectional power transmitting unit (e.g., a one-way clutch 50 in embodiment) which is provided in parallel to the connection/disconnection unit on the power transmission path between the drive source and the driven portion, and which is configured so that the unidirectional power transmitting unit is engaged when a rotational power of a drive source side in one direction is inputted into a driven portion side, is disengaged when a rotational power of the drive source side in the other direction is inputted into the driven portion side, is disengaged when a rotational power of the driven portion side in the one direction is inputted into the drive source side, and is engaged when a rotational power of the driven portion side in the other direction is inputted into the drive source side, and when the continuous applied time obtained by the time counter is equal to or greater than the predetermined time in a case of the drive source generating the rotational power in the one direction, the connection/disconnection unit controller continues to apply the connection/disconnection unit until a command to the drive source is switched to an instruction of generating the rotational power in the other direction, and releases the connection/disconnection unit after the power source has finished generating the rotational power in the one direction and before the power source starts generating the rotational power in the other direction.

In addition to the configuration described in the fourth aspect, a fifth aspect is characterized in that the vehicle is a wheeled vehicle (e.g., a wheeled vehicle 3 in embodiment), the driven portion is a wheel (e.g., rear wheels Wr in embodiment) of the wheeled vehicle, the wheeled vehicle includes a brake unit that brakes a rotation of the wheel, and when the connection/disconnection unit is released before the drive source starts generating the rotational power in the other direction, the brake unit is caused to generate a braking, force that complements the rotational power in the other direction so as to compensate for a delay in a start of generating the rotational power in the other direction.

In addition to the configuration described in the second aspect, a sixth aspect is characterized in that the vehicle is a wheeled vehicle (e.g., a wheeled vehicle 3 in embodiment), the driven portion is a first drive wheel (e.g., rear wheels Wr in embodiment), which is either one of a front wheel and a rear wheel that are wheels of the wheeled vehicle, the wheeled vehicle includes another drive source (e.g., an internal combustion engine 4, a motor 5 in embodiment), which is configured to drive a second drive wheel (e.g., front wheels Wf in embodiment) that is the other of the front wheel and the rear wheel, and when the continuous applied time obtained by the time counter is equal to or greater than a predetermined time in a case of the another drive source generating the rotational power in the one direction, the connection/disconnection unit controller releases the connection/disconnection unit.

In addition to the configuration described in the second aspect, a seventh aspect is characterized in that when the time counter obtains a continuous applied time that is equal to or greater than the predetermined time in a case of the vehicle moving, the connection/disconnection unit controller waits to release the connection/disconnection unit until the vehicle stops.

In addition to the configuration described in the seventh aspect, an eighth aspect is characterized in that the vehicle is a wheeled vehicle (e.g., a wheeled vehicle 3 in embodiment), the driven portion is a wheel (e.g., rear wheels Wr in embodiment) of the wheeled vehicle, the wheeled vehicle includes a brake unit that brakes a rotation of the wheel, and when the wheeled vehicle stops and the connection/disconnection unit is released, the drive source is caused to generate a power and the brake unit is activated to operate.

In addition to the configuration described in the third or fourth aspect, a ninth aspect is characterized in that when the rotational power in the one direction of the drive source side is inputted into the driven portion side, the connection/disconnection unit controller applies the connection/disconnection unit so that the drive source side and the driven portion side are put in a connected state.

Advantage of the Invention

According to the first aspect, the continuous applied time of the wet multiple disc connection/disconnection unit is obtained by the time counter, based on which the release of the connection/disconnection unit can be controlled, thereby making it possible not only to realize the power transmission that is the basic function of the connection/disconnection unit but also to protect the connection/disconnection unit appropriately.

According, to the second aspect, it is possible to prevent the extension of the applied time of the connection/disconnection unit, thereby making it possible to supply a lubricant between the multiple discs of the connection/disconnection unit in association with the release of the connection/disconnection unit.

According to the third aspect, even though the connection/disconnection unit is released while the motor is generating a rotational power in one direction, the unidirectional power transmitting unit does not rotate, and the eccentricity is not eliminated. Therefore, the occurrence of an unnecessary release of the connection/disconnection unit is restricted by waiting to release the connection/disconnection unit until the rotational power of the drive source in one direction reaches the vicinity of zero.

According to the fourth aspect, when the direction of the rotational power of the drive source switches from the one direction to the other direction, releasing the connection/disconnection unit is inserted in an interrupted fashion before the start of generation of a rotational power in the other direction, whereby the connection/disconnection unit can be lubricated appropriately only by changing the timing at which the generation of torque is started without changing the torque indication value itself.

According to the fifth aspect, the rotational power in the other direction, that is, the braking rotational power can also be generated by other components than the drive source, and therefore, the braking force required by the whole of the wheeled vehicle can be satisfied.

According to the sixth aspect, in a case of the second drive Wheel being driven by the another drive source, even though the wheeled vehicle cannot be driven by the first drive wheel as a result of releasing the connection/disconnection unit on the power transmission path for the first drive wheel, the driving force required by the whole of the wheeled vehicle can be maintained by the use of the driving force of the second drive wheel.

According to the seventh aspect, the wheeled vehicle can he least affected in moving by releasing the connection/disconnection unit by waiting to do it until the wheeled vehicle comes to a halt.

According to the eighth aspect, the scooping effect of the lubricant can be obtained by causing the drive source to generate torque, thereby making it possible to supply the lubricant in a more ensured fashion.

According to the ninth aspect, there are fears that the continuous applied time of the connection/disconnection unit is extended, and therefore. the connection/disconnection unit can be protected more effectively.

BRIEF DESCRIPTION OF DRAWINGS

FIG. 4 is a table depicting relationships between a front wheel driving system and the rear wheel driving system in a various wheeled vehicle states together with operating states of a motor.

MODE FOR CARRYING OUT THE INVENTION

Firstly, an embodiment of a driving system according to the invention will be described based on FIGS. 1 to 3. The driving system can be used for vehicle such as wheeled vehicles, aircraft and vessels. However, in the following embodiment, the driving system will be described as being applied to a wheeled vehicle.

Figure 1:
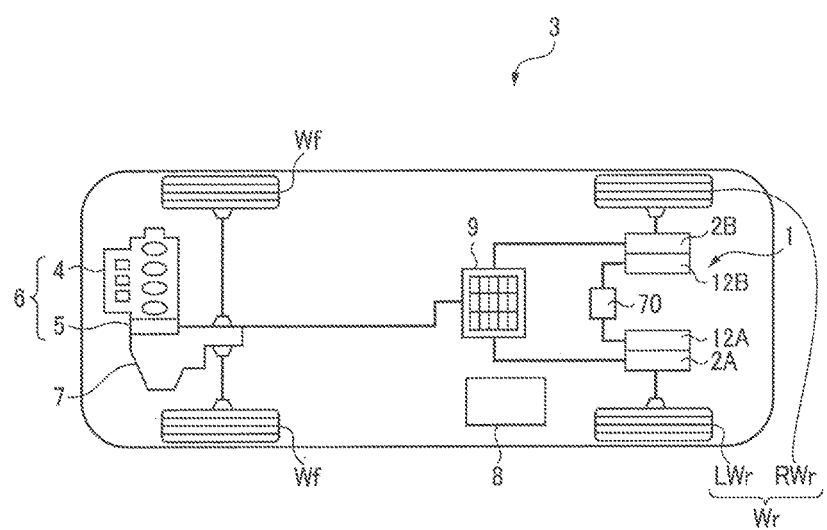
FIG. 1 is a block diagram showing a schematic configuration of a hybrid wheeled vehicle according to an embodiment of the invention on which a driving system according to the invention can be mounted.

The wheeled vehicle driving system of this embodiment uses motors as drive sources to drive axle shafts and is used on a wheeled vehicle having a driving system that is shown in FIG. 1. In the following description, the wheeled vehicle driving system will be described as being used to drive rear wheels. However, the wheeled vehicle driving system may be used to drive front wheels.

A wheeled vehicle 3 shown in FIG. 1 is a hybrid wheeled vehicle having a driving system 6 (hereinafter, referred to as a "front wheel driving system") in which an internal combustion engine 4 and a motor 5 are connected in series at a front portion of the wheeled vehicle. Power of this front driving system 6 is transmitted to front wheels Wf by way of a transmission 7, while power of a driving system 1 (hereinafter, referred to as a "rear wheel driving system") that is provided separately from the front wheel driving system 6 at a rear of the wheeled vehicle is transmitted to rear wheels Wr (RWr, LWr). The motor 5 of the front wheel driving system 6 and a first and second motors 2A, 2B of the rear wheel driving system 1 on the rear wheels Wr side are connected to a battery 9, so that electric power can be supplied to the motors from the battery 9, while energies generated at the driving systems can be recovered at the battery 9 for regeneration. Reference numeral 8 denotes a controller configured to perform various controls for the whole of the wheeled vehicle.

Figure 2:
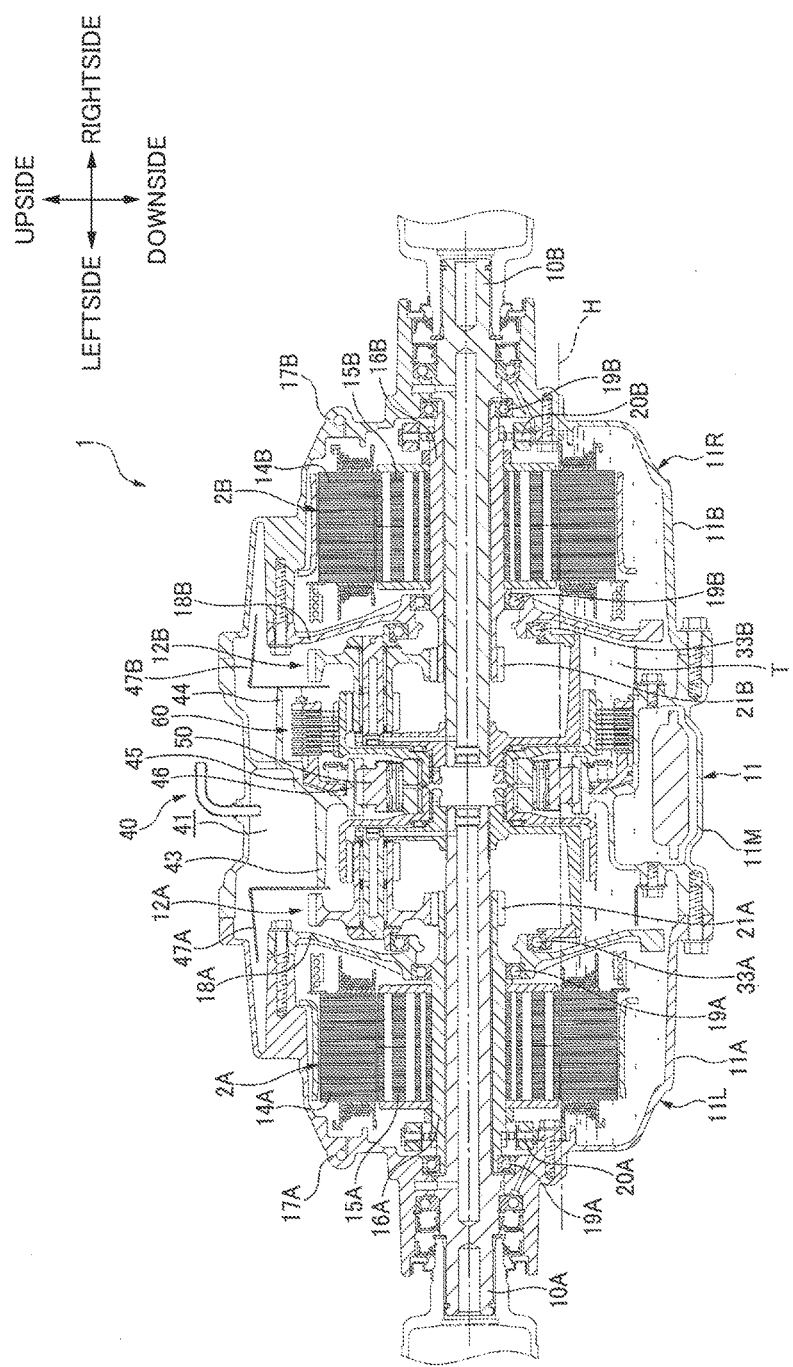
FIG. 2 is a vertical longitudinal sectional view of an embodiment of a rear wheel driving system.
Figure 3:
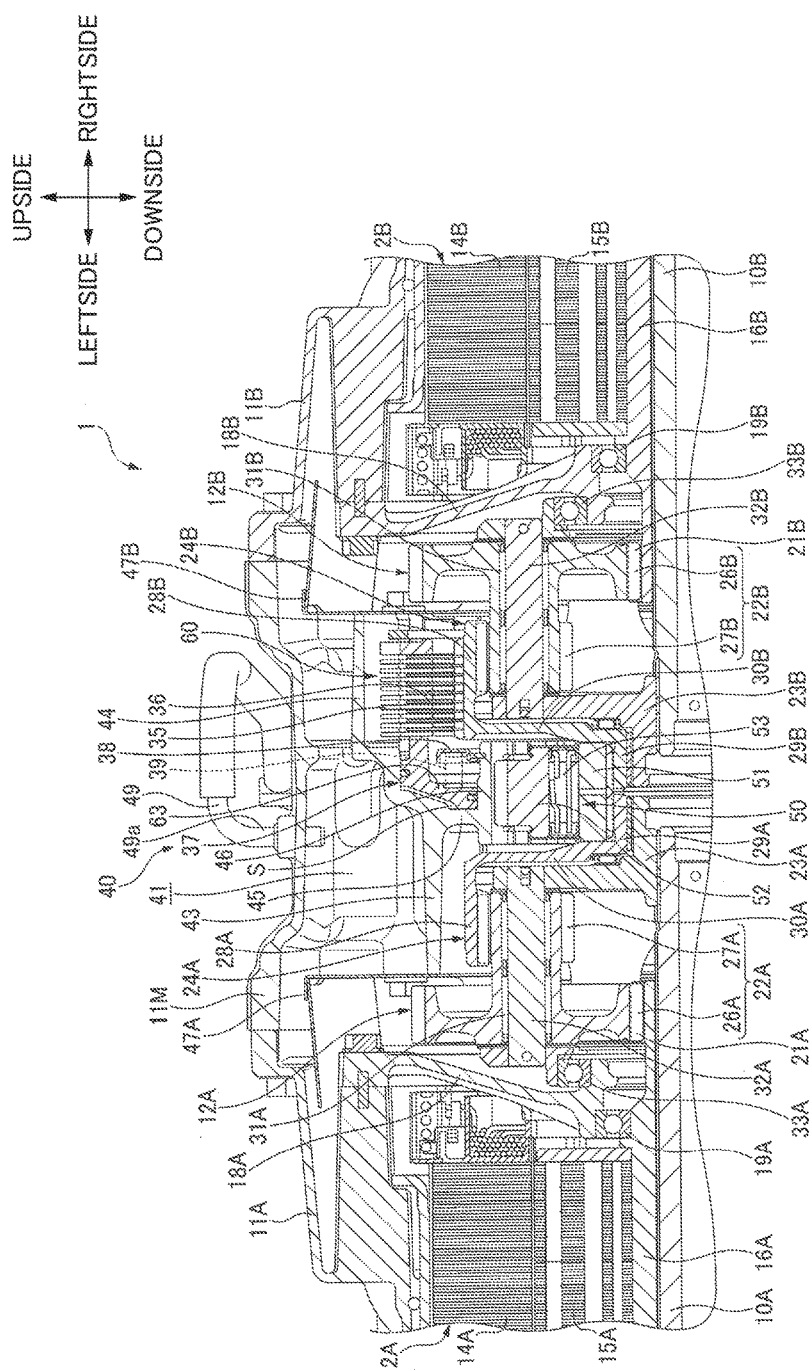
FIG. 3 is a partial enlarged sectional view of the rear wheel driving system shown in FIG. 2.

FIG. 2 shows a vertical longitudinal cross sectional view of the whole of the rear wheel driving system 1. In FIG. 2, reference numerals 10A, 10B denote left and right axle shafts of the rear wheels Wr of the wheeled vehicle 3. A speed reducer case 11 of the rear wheel driving system 1 has a substantially cylindrical shape as a whole. The first and second motors 2A, 2B configured to drive the axle shafts and a first and second planetary gear type speed reducers 12A, 12B configured to decelerate the driving rotation of the first and second motors 2A, 2B are disposed coaxially with the axle shafts 10A, 10B in an interior of the speed reducer case 11. The first motor 2A and the first planetary gear type speed reducer 12A function as a left wheel driving system that drives the left rear wheels LWr. The second motor 2B and the second planetary gear type speed reducer 12B function as a right wheel driving system that drives the right rear wheels RWr. The first motor 2A and the first planetary gear type speed reducer 12A are disposed laterally symmetrical with the second motor 2B and the second planetary gear type speed reducer 12B in a Wheeled vehicle's width direction within the speed reducer case 11.

In the rear wheel driving system 1, a breather device 40 that establishes a communication between the interior and an exterior of the case 11 is provided so that an in the interior of the case 11 is released to the exterior by way of a breather chamber 41 so as to prevent the air from being extremely heated to high temperatures or being extremely pressurized to high pressures in the interior of the case 11. The breather chamber 41 is disposed at a vertically upper portion in the case 11 and is constituted by a space that is defined by an external wall of a central case 11M, a first cylindrical wall 43 that is provided in the central case 11M so as to extend substantially horizontally towards a left side case 11A, a second cylindrical wall 44 that is provided so as to extend substantially horizontally towards a right side case 11B, a left-right separating wall 45 that connects together inner end portions of the first and second cylindrical walls 43, 44, a baffle plate 47A that is mounted so as to be brought into abutment with a distal end portion of the first cylindrical wall 43 that faces the left side case 11A, and a baffle plate 47B that is mounted so as to be brought into abutment with a distal end portion of the second cylindrical wall 44 that faces the right side case 11B.

In the first and second cylindrical walls 43, 44 and the left-right separating wall 45 that define a lower surface of the breather chamber 41, the first cylindrical wall 43 is situated further radially inwards than the second cylindrical wall 44, and the left-right separating wall 45 extends to an inner end portion of the first cylindrical wall 43 while bending so as to be radially contracted in diameter from an inner end portion of the second cylindrical wall 44, and extends further radially inwards to reach a third cylindrical wall 46 that extends substantially horizontally. The third cylindrical wall 46 is situated further inwards than outer end portions of both the first cylindrical wall 43 and the second cylindrical wall 44 and substantially in the center therebetween.

In the central case 11M, the baffle plates 47A, 47B are fixed so as to divide a space defined between the first cylindrical wall 43 and an external wall of the central case 11M or a space defined between the second cylindrical wall 44 and the external wall of the central case 11M from the first planetary gear type speed reducer 12A or the second planetary gear type speed reducer 12B, respectively.

Additionally an external communication passageway 49 which establishes a communication between the breather chamber 41 and the exterior of the case 11 is connected to a vertically upper surface of the breather chamber 41 in the central case 11M. A breather chamber side end portion 49a of the external communication passageway 49 is disposed so as to be directed vertically downwards. Consequently, oil is restricted from being discharged to the exterior through the external communication passageway 49.

In the first and second motors 2A, 2B, stators 14A, 14B are fixed to the side cases 11A, 11B, respectively and annular rotors 15A, 15B are disposed, respectively, on inner circumferential sides of the stators 14A, 14B so as to rotate relatively to the corresponding stators 14A, 14B. Cylindrical shafts 16A, 16B which surround outer circumferences of the axles 10A, 10B are connected to inner circumferential portions of the rotors 15A, 15B, respectively and the cylindrical shafts 16A, 16B are supported in end walls 17A, 17B of the side cases 11A, 11B and the partition walls 18A, 18B via bearings 19A, 19B so as to rotate relative to the axles 10A and 10B coaxially. Additionally, resolvers 20A, 20B, which are configured to feed back information on rotational positions of the rotors 15A, 15B to a controller (not shown) which controls the first and second motors 2A, 2B, are provided on the end walls 17A, 17B which are situated on outer circumferences of ends of the cylindrical shafts 16A, 16B. The first and second motors 2A, 2B which include the stators 14A, 14B and the rotors 15A, 15B, respectively, have the same radius, and the first and second motors 2A, 2B are disposed mirror symmetrical with each other. The axle shaft 10A and the cylindrical shaft 16A penetrate through an interior of the first motor 2A to extend from both end portions of the first motor 2A. The axle shaft 10B and the cylindrical shaft 16B also penetrate through an interior of the second motor 2B to extend from both end portions of the second motor 2B.

The first and second planetary gear type speed reducers 12A. 12B include sun gears 21A, 21B, ring gears 24A, 24B which are situated on outer circumferential sides of the sun gears 21A, 21B, pluralities of planetary gears 22A, 22B Which mesh with the sun gears and the ring gears 24A, 24B, and planetary carriers 23A, 23B which support the planetary gears 22A, 22B. The torque of the first and second motor 2A, 2B is inputted from the sun gears 21A, 21B, and the torque which is decelerated is outputted to the axle shafts 10A, 10B via the planetary carriers 23A, 23B.

The sun gears 21A, 21B are formed integrally on the cylindrical shafts 16A, 16B, respectively Additionally, the planetary gears 22A, 22B are double pinions having first pinions 26A, 26B which are greater in diameter and which mesh directly with the sun gears 21A, 21B and second pinions 27A, 27B which are smaller in diameter than the first pinions 26A, 26B. The first pinions 26A, 26B and the second pinions 27A, 27B are formed integrally so as not only to be concentric but also to be offset in an axial direction. The planetary gears 22A, 22B are supported on pinion shafts 32A, 32B of the planetary carriers 23A, 23B via needle bearings 31A, 31B. Axial inner end portions of the planetary carriers 23A, 23B extend radially inwards and are spline fitted on the axle shafts 10A, 10B, whereby the planetary carriers 23A, 23B are supported on the axle shafts 10A, 10B so as to rotate together. The planetary carriers 23A, 2313 are also supported in the partition walls 18A, 18B via bearings 33A, 33B.

The ring gears 24A, 24B include gear portions 28A, 28B which mesh with the second pinion gears 27A, 27B, which are smaller in diameter, on inner circumferential surfaces thereof, small diameter portions 29A, 29B which are smaller in diameter than the gear portions 28A, 28B and which are disposed so as to face each other in a middle position of the case 11, and connecting portions 30A, 30B which connect axial inner end portions of the gear portions 28A, 28B and axial outer end portions of the small diameter portions 29A, 29B together in a radial direction.

The gear portions 28A, 28B face each other in the axial direction in such a way as to sandwich the third cylindrical wall 46 which is formed at a radially inner end portion of the left-right separating wall 45 of the central case 11M therebetween. The small diameter portions 29A, 29B spline fit in inner races 51 of a one-way clutch 50, which will be described later, on outer circumferential surfaces thereof, and the ring gears 24A, 24B are connected to each other so as to rotate together with the inner races 51 of the one-way clutch 50.

A hydraulic brake 60 which constitutes a brake unit for the ring gear 24B is disposed on the second planetary gear type speed reducer 12B side and between the second cylindrical wall 44 of the central case 11M which constitutes the case 11 and the gear portion 28B of the ring gear 24B in such a way as to overlap the first pinion 26B in the radial direction and to overlap the second pinion 27B in the axial direction. In the hydraulic brake 60, a plural fixed plates 35 which are spline fitted in an inner circumferential surface of the second cylindrical wall 44 and a plural rotational plates 36 which are spline fitted on an outer circumferential surface of the gear portion 28B of the ring gear 24B are disposed alternately in the axial direction, and these plates 35, 36 are operated to be engaged with and disengaged from each other by an annular piston 37. The piston 37 is housed in an annular cylinder chamber defined between the left-right separating wall 45 and the third cylindrical wall 46 in the central case 11M so as to reciprocate freely therein. Further, the piston 37 is biased in a direction in which the fixed plates 35 and the rotational plates 36 are disengaged from each other at all times by an elastic member 39 which is supported by a bearing seat 38 which is provided on an outer circumferential surface of the third cylindrical wall 46.

To describe in greater detail, a space defined between the left-right separating wall 45 and the piston 37 is made into a working chamber S into which the oil is directly introduced. When the pressure of the oil which is introduced into the working chamber S overcomes the biasing force of the elastic member 39, the piston 37 moves forwards (rightwards), and the fixed plates 35 and the rotational plates 36 are pressed against each other for engagement. On the other hand, when the biasing force of the elastic member 39 overcomes the pressure of the oil which is introduced into the working chamber S. the piston 37 moves backwards (leftwards), and the fixed plates 35 and the rotational plates 36 are separated to be disengaged from each other. The hydraulic brake 60 is connected to an electric oil pump 70 (refer to FIG. 1).

In the case of this hydraulic brake 60, the fixed plates 35 are supported on the second cylindrical wall 44 which extends from the left-right separating wall 45 of the central case 11M which constitutes the case 11, while the rotational plates 36 are supported on the gear portion 2813 of the ring gear 24. Therefore, when both the plates 35, 36 are pressed against each other by the piston 37, the plates 35, 36 are brought into frictional engagement with each other, whereby a braking force acts or the ring gear 24B to there fix the ring gear 24B. When the engagement by the piston 37 is released from that state, the ring gear 24B is permitted to rotate freely. Since the ring gears 24A, 24B are connected to each other as described above, when the hydraulic brake 60 is applied, the braking force also acts on the ring gear 24A to thereby fix the ring gear 24A. When the hydraulic brake 60 is released, the ring gear 24A is also permitted to rotate freely.

A space portion is also ensured between the connecting portions 30A, 30B of the ring gears 24A, 24B which face each other in the axial direction. The one-way clutch 50 is disposed within the space portion, the one-way clutch 50 being configured to transmit power to the ring gears 24A, 24B only in one direction and to cut off power acting, in the other direction. The one-way clutch 50 includes a large number of sprags 53 which are interposed between the inner races 51 and an outer race 52, and the inner races 51 rotate together with the small diameter portions 29A, 29B of the ring gears 24A, 24B through spline fitting. In addition, the outer race 52 is positioned by the third cylindrical wall 46 and is prevented from rotating thereby.

The one-way clutch 50 is engaged to lock the rotation of the ring, gears 24A, 24B when the wheeled vehicle 3 travels forwards by the power of the first and second motors 2A, 2B. To describe this in greater detail, the one-way clutch 50 is engaged when the rotational power of the first and second motors 2A, 2B side in a forward direction is rotational direction when the wheeled vehicle 3 is caused to travel forwards) is inputted into the rear wheels Wr side, while the one-way clutch 50 is disengaged when the rotational power of the first and second motors 2A, 2B side in a reverse direction is inputted into the rear wheels Wr side. The one-way clutch 50 is disengaged when the rotational power of the rear wheels Wr side in the forward direction is inputted into the first and second motors 2A, 2B side, while the one-way clutch 50 is engaged when the rotational power of the wheels Wr side in the reverse direction is inputted into the first and second motors 2A, 2B side.

In the rear wheel driving system 1 of this embodiment configured as has been described heretofore, the one-way clutch 50 and the hydraulic brake 60 are disposed in parallel on a power transmission path between the first and second motors 2A, 2B and the rear wheels Wr. An oil storage portion T where oil is stored is formed at a lower portion of the case 11, and oil is stored to such an oil level (denoted by reference numeral H in FIG. 2) that lower ends of the rotors 15A, 15B of the first and second motors 2A, 2B are not submerged in the oil stored therein, and lower portions of the fixed plates 35 and the rotational plates 36 are situated in the oil storage portion T.

Here, the controller 8 (refer to FIG. 1) is a controller which controls various controls of the whole of the wheeled vehicle, and Wheel speed sensor values, motor rotation speed sensor values of the first and second motors 2A, 2B, steeling angle, accelerator pedal position AP, shift position, state of charge (SOC) at the battery 9, oil temperature and the like are inputted into the controller S. On the other hand, a signal to control the internal combustion engine 4, signals to control the first and second motors 2A, 2B, a control signal to control the electric oil pump 70 and the like are outputted from the controller 8.

Namely, the controller 8 includes at least a function as a motor controller to control the first and second motors 2A, 2B and a function as a connection/disconnection unit controller to control the application and release of the hydraulic brake 60 as a connection/disconnection unit.

FIG. 4 is a table depicting relationships between the front wheel driving system 6 and the rear wheel driving system 1 in a various wheeled vehicle states together with operating states of the first and second motors 2A, 2B. In the figure, a front unit represents the front wheel driving system 6, a rear unit represents the rear wheel driving system 1, a rear motor represents the first and second motors 2A, 2B, OWC represents the one-way clutch 50, and BRK represents the hydraulic brake 60. Additionally, FIGS. 5 to 10 show speed collinear diagrams in various states of the rear wheel driving system 1. LMOT represents the first motor 2A. RMOT represents the second motor 2B, S and C on the left-hand side represent the sun gear 21A of the first planetary gear type speed reducer 12A connected to the first motor 2A and the planetary carrier 23A of the first planetary gear type speed reducer 12A, respectively, S and C on the right-hand side represent the sun gear 21B of the second planetary gear type speed reducer 12B and the planetary carrier 23B of the second planetary gear type speed reducer 12B, respectively, R represents the ring gears 24A, 24B of the first and second planetary gear type speed reducers 12A, 12B, BRK represents the hydraulic brake 60, and OWC represents the one-way clutch 50. In the following description, the rotational directions of the sun gears 21A, 21B which are rotated by the first and second motors 2A, 2B when the wheeled vehicle travels forwards will be referred to as a forward direction. Additionally, in the figures, upward motions of the sun gears and the planetary carriers from a state where the wheeled vehicle is at a halt represent forward rotations of the motors, downward motions of the sun gears and the planetary carriers from the halt state represent reverse rotations of the motors, upward arrows represent forward torque, and downward arrows represent reverse torque.

Figure 5:
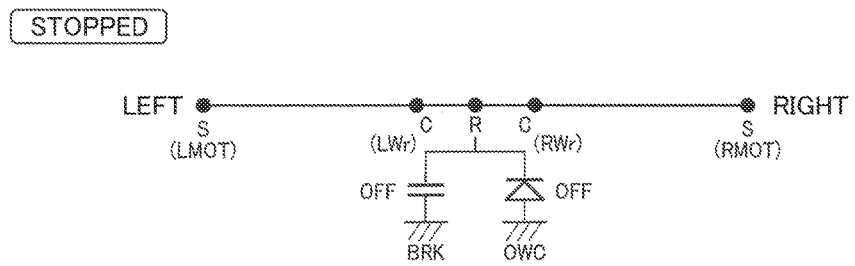
FIG. 5 is a speed collinear diagram of the rear wheel driving system while the wheeled vehicle is at a halt.

When the wheeled vehicle is at a halt, both the front wheel driving system 6 and the rear wheel driving system 1 are not driven. Consequently, as shown in FIG. 5, the first and second motors 2A, 2B of the rear wheel driving system 1 are not in operation, and hence, the axle shafts 10A, 10B are also not in operation. Therefore, no torque acts on any of the constituent elements. In this state, the hydraulic brake 60 is released (OFF). Additionally, the one-way clutch 50 is not engaged because the first and second motors 2A, 2B are not driven.

Figure 6:
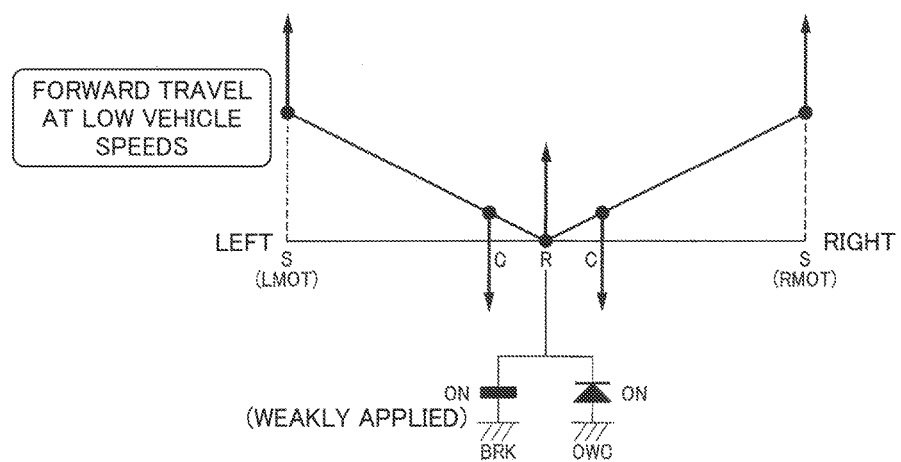
FIG. 6 is a speed collinear diagram of the rear wheel driving system while wheeled vehicle is traveling forwards at low vehicle speeds.

Then, when the wheeled vehicle travels forwards at low vehicle speeds with good motor efficiency as in the EV start or the EV cruise after a key position is turned to an ON position, a rear wheel drive is performed by the rear wheel driving system 1. As shown in FIG. 6, When a power running drive is performed so that the first and second motors 2A, 2B rotate in the forward direction, forward torque is applied to the sun gears 21A, 21B. At this time, the one-way clutch 50 is engaged and the ring gears 24A, 24B are locked, as has been described above. This causes the planetary gears 23A, 23B to rotate in the forward direction, whereby the wheeled vehicle is caused to travel forwards. In addition, a travel resistance is acting on the planetary carriers 23A, 23B in the reverse direction from the axle shafts 10A, 10B. When the wheeled vehicle 3 starts traveling forwards in this way, the key position is turned to the ON position and the torque of the first and second motors 2A, 2B is increased, whereby the one-way clutch 50 is engaged mechanically and the ring gears 24A, 24B are locked.

At this time, the hydraulic brake 60 is controlled to be weakly applied. The weakly applied state means a state in which although power can be transmitted, the hydraulic brake 60 is applied with an application force which is weaker than an application force in a state where the hydraulic brake 60 is applied normally. The one-way clutch 50 is engaged when the forward torque of the first and second motors 2A, 2B is inputted into the rear wheels Wr, and the power can be transmitted only by the one-way clutch 50. However, the hydraulic brake 60 which is provided parallel to the one-way clutch 50 is also applied weakly to connect the first and second motors 2A, 2B side and the rear wheels Wr side with each other, whereby it is possible to restrict the occurrence of a risk of no power being transmitted between the first and second motors 2A, 2B side and the rear wheels Wr side even though the one-way clutch 50 is disengaged as a result of the forward torque from the first and second motors 2A, 2B being reduced temporarily. In addition, it is not necessary to perform a rotation speed control which is otherwise necessary to connect the first and second motors 2A, 2B side and the rear wheels Wr side with each other when the driving of the wheeled vehicle is shifted to a regenerative deceleration, which will be described later. The energy to be consumed to apply the hydraulic brake 60 is reduced by making an application force of the hydraulic brake 60 in a state where the one-way clutch 50 is engaged weaker than an application force of the hydraulic brake 60 in a state where the one-way clutch 50 is disengaged.

Figure 7:
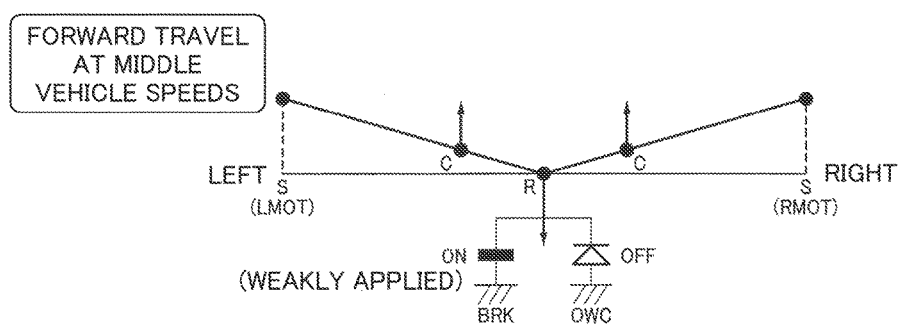
FIG. 7 is a speed collinear diagram of the rear wheel driving system while the wheeled vehicle is traveling forwards at middle vehicle speeds.
Figure 8:
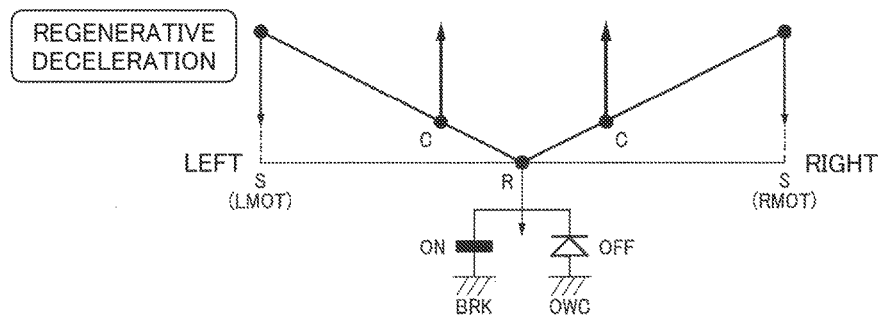
FIG. 8 is a speed collinear diagram of the rear wheel driving system while the wheeled vehicle is being decelerated for regeneration.

When the vehicle speed is increased from the forward traveling at low vehicle speeds to a forward traveling at middle vehicle speeds with good engine efficiency, the driving of the wheeled vehicle is shifted from the rear wheel driving by the rear wheel driving system 1 to the forward wheel driving by the hunt wheel driving system 6. As shown in FIG. 7, when the power running drive by the first and second motors 2A, 2B is stopped, the forward torque attempting to drive the wheeled vehicle forwards is applied to the planetary carriers 23A, 23B from the axle shafts 10A, 10B. Therefore, as has been described above, the one-way clutch 50 is disengaged. At this time, the hydraulic brake 60 is also controlled to be applied weakly When the first and second motors 2A, 2B are attempted to be driven for regeneration from the state shown in FIG. 6 or 7, as shown in FIG. 8, the forward torque attempting to keep the wheeled vehicle traveling forwards is applied to the planetary carriers 23A, 23B from the axle shafts 10A, 10B, and therefore, the one-way clutch 50 is disengaged as has been described above. At this time, the hydraulic brake 60 is controlled to be applied (ON). Consequently, the ring gears 24A, 24B are locked, and reverse regenerative braking torque is applied on the first and second motors 2A, 2B, whereby a regenerative deceleration is executed at the first and second motors 2A, 2B. In this way, when the forward torque of the rear wheels Wr is inputted into the first and second motors 2A, 2B, the one-way clutch 50 is disengaged, whereby the power cannot be transmitted only by the one-way clutch 50. However, the power can still be transmitted by causing the hydraulic brake 60 which is provided parallel to the one-way clutch 50 to be applied to connect the first and second motors 2A, 2B side and the rear wheels Wr side with each other. Then, the energy of the wheeled vehicle 3 can be recovered for regeneration by controlling the first and second motors 2A, 2B to be driven for regeneration.

Following this, when the wheeled vehicle is accelerated, a four-wheel driving is executed by the front wheel driving system 6 and the rear wheel driving system 1, and the rear wheel driving system 1 becomes the same sate as that of the forward traveling at low vehicle speeds as shown in FIG. 6.

When the wheeled vehicle 3 is traveling forwards at high vehicle speeds, the front wheel driving is executed by the front wheel driving system 6, in which case the first and second motors 2A, 2B are stopped and the hydraulic brake 60 is controlled to be released. The one-way clutch 50 is disengaged because the forward torque at the rear wheels Wr is inputted into the first and second motors 2A, 2B, and the ring gears 24A, 24B start to rotate by controlling the hydraulic brake 60 to be released.

Figure 9:
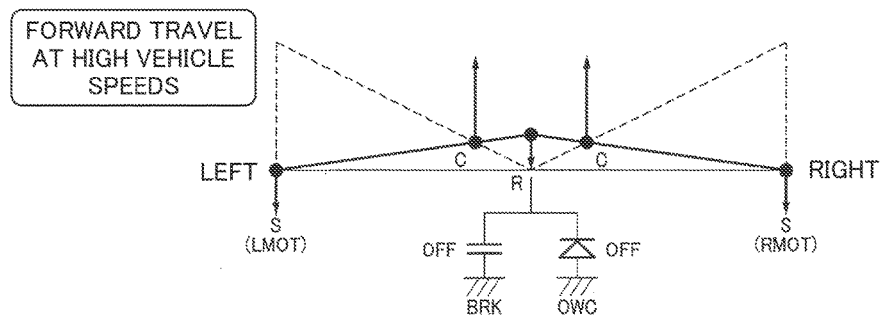
FIG. 9 is a speed collinear diagram of the rear wheel driving system while the wheeled vehicle is traveling forwards at high vehicle speeds.

As shown in FIG. 9, When the first and second motors 2A, 2B stop the power running drive, the forward torque attempting to cause the wheeled vehicle to travel forwards acts on the planetary carriers 23A, 23B from the axle shafts 10A, 10B. Therefore. as has been described above, the one-way clutch 50 is disengaged. At this time, the rotation losses at the sun gears 21A, 21B and the first and second motors 2A, 2B are inputted into the sun gears 21A, 21B as a resistance, and rotation loses of the ring gears 24A, 24B are generated at the ring gears 24A, 24B.

The ring gears 24A, 24B are permitted to rotate freely by controlling the hydraulic brake 60 to be released, whereby the connection of the first and second motors 2A, 2B and the rear Wheels Wr is cutoff, thereby making it unable to transmit the power therebetween. Consequently, the forced associated rotation of the first and second motors 2A, 2B is prevented, whereby the over revolution of the first and second motors 2A, 2B is prevented when the wheeled vehicle 3 is driven at high vehicle speeds by the front wheel driving system 6.

Figure 10:
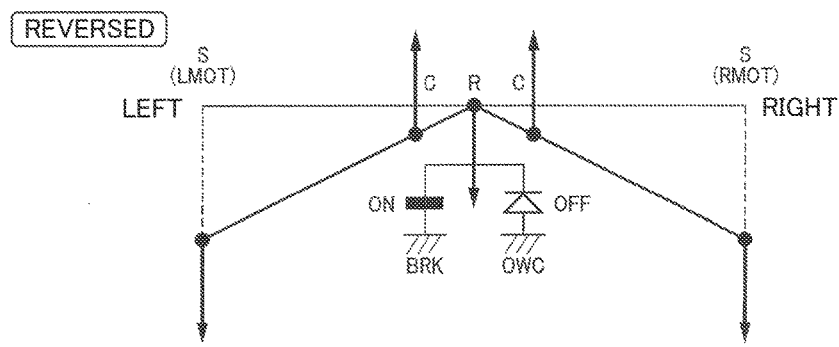
FIG. 10 is a speed collinear diagram of the rear wheel driving system while the wheeled vehicle is being reversed.

When the wheeled vehicle is reversed, as shown in FIG. 10, the first and second motors 2A, 2B are driven through reverse power running, torque in the reverse direction is applied to the sun gears 21A, 21B. At this time, as has been described above, the one-way clutch 50 is disengaged.

At this time, the hydraulic brake 60 is controlled to be applied. Consequently, the ring gears 24A, 24B are locked, and the planetary carriers 23A, 23B are rotated in the reverse direction. whereby the wheeled vehicle is driven reversely. In this case, a travel resistance is acting on the planetary carriers 23A, 23B in the forward direction from the axle shafts 10A, 10B. In this way, when the reverse torque of the first and second motors 2A, 2B is inputted into the rear wheels Wr, the one-way clutch 50 is disengaged, whereby the power cannot be transmitted only by the one-way clutch 50. However, the power can still be transmitted by causing the hydraulic brake 60 which is provided parallel to the one-way clutch 50 to be applied to connect the first and second motors 2A, 2B side and the rear Wheels Wr side with each other. Then, the wheeled vehicle 3 can be reversed by the torque of the first and second motors 2A, 2B.

In this way in the rear wheel driving system 1, the hydraulic brake 60 is controlled to be applied or released according to the traveling states of the wheeled vehicle, in other words, whether the first and second motors 2A, 2B rotate in the forward direction or the reverse direction and whether the power is inputted from the first and second motors 2A, 2B or the rear wheels Wr, and the application force is adjusted even when the hydraulic brake 60 is being applied.

Figure 11:
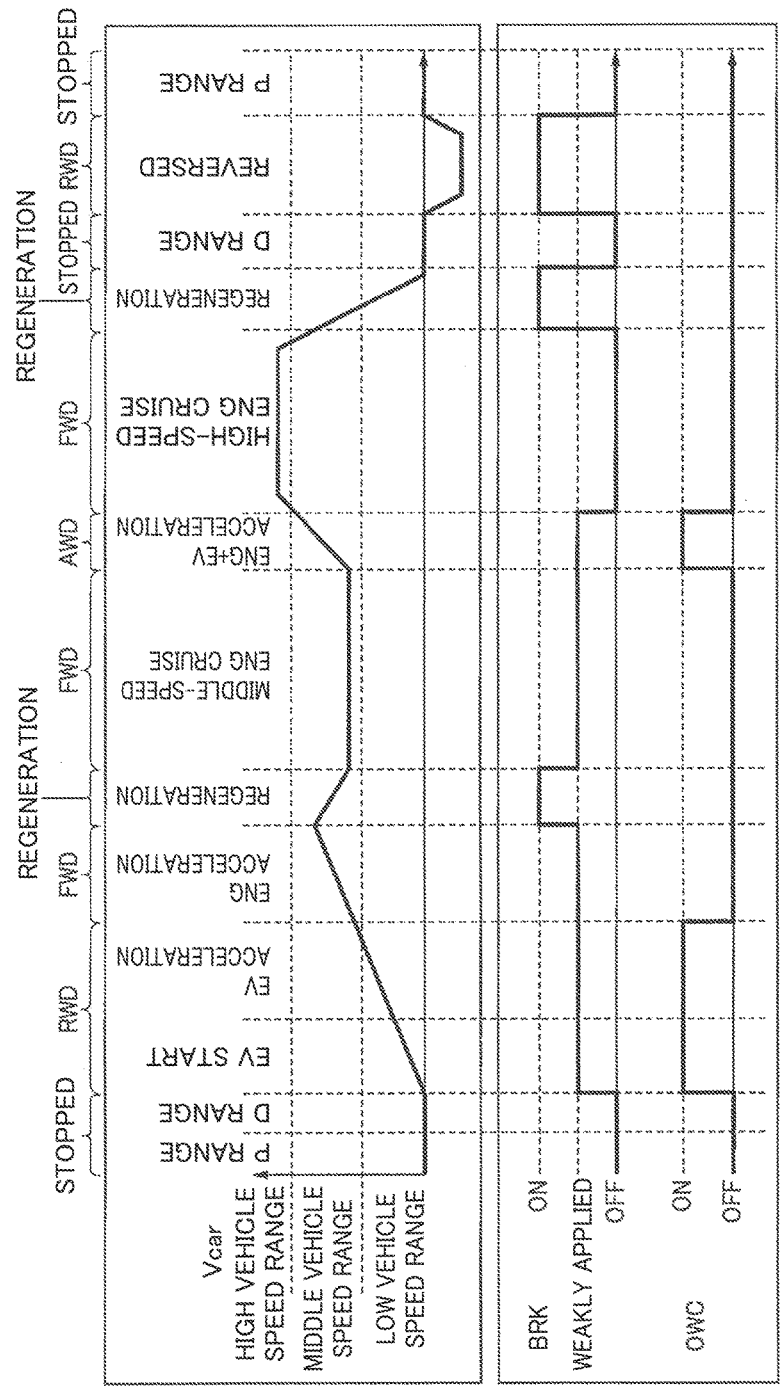
FIG. 11 is a timing chart of an example of driving of the wheeled vehicle.

FIG. 11 is a timing chart of the one way clutch 50 (OWC) and the hydraulic brake 60 (BRK) when the wheeled vehicle performs a series of actions of EV start from a stop->EV acceleration->ENG acceleration->regenerative deceleration->middle-speed ENG cruise->ENG+EV acceleration->high-speed ENG cruise->regenerative deceleration->stop->reversing->stop.

Firstly, the one-way clutch 50 is kept disengaged (OFF) and the hydraulic brake 60 is kept released (OFT) until the key position is turned to the ON position, the shift range is shifted from the P range to the D range and the accelerator pedal is depressed. When the accelerator pedal is depressed from that state. the EV start, and the EV acceleration through rear wheel driving (RWD) by the rear wheel driving system 1 is performed. At this time, the one-way clutch 50 is engaged (ON), and the hydraulic brake 60 is weakly applied. Then, when the driving of the wheeled vehicle is shifted from the rear wheel driving to the front wheel driving as a result of the vehicle speed reaching the middle vehicle speed range from the low vehicle speed range, the wheeled vehicle is driven through ENG driving (FWD) by the internal combustion engine 4. At this time, the one-way clutch 50 is disengaged (OFF), and the hydraulic brake 60 remains in the same state (the weakly applied state). Then, when the regenerative deceleration is performed on the wheeled vehicle as a result of a brake pedal being depressed, for example, the one-way clutch 50 is disengaged (OFF), and the hydraulic brake 60 is applied (ON). While the wheeled vehicle is cruising at middle vehicle speeds b the use of the power of the internal combustion engine 4, the same state as the ENG driving described above results. Following this, when the accelerator pedal is depressed further, shifting the driving of the wheeled vehicle from the front wheel driving to the four-wheel driving (AWD), the one-way clutch 50 is engaged (ON) again. Then, when the vehicle speed reaches the high vehicle speed range from the middle vehicle speed range, the wheeled vehicle is ENG driven (FWD) by the internal combustion engine 4 again. At this time, the one-way clutch 50 is disengaged (OFF), and the hydraulic brake 60 is released (OFF), whereby the first and second motors 2A, 2B are stopped. Then, when the regenerative deceleration is performed, the same state as the regenerative deceleration described above results. Then, when the wheeled vehicle comes to a halt, the one-way clutch 50 is disengaged (OFF), and the hydraulic brake 60 is released (OFF).

Here, the characteristics of the hydraulic brake 60 will be described. The hydraulic brake 60 is a so-called wet multiple disc type brake. As has been described above, the plural fixed plates 35 and the plural rotational plates 36 are disposed alternately, and these plates 35, 36 are engaged with and disengaged from each other by the annular piston 37. In the wet multiple disc type brake, both the plates 35, 36 are lubricated with the oil used as a lubricant, and therefore, since the oil functions as a damper, compared with a dry clutch, a shock generated when the plates are engaged with each other becomes moderate.

Lower portions of the rotational plates 36 which are spline fitted on the outer circumferential surface of the gear portion 28B of the ring gear 24B are situated in the oil storage portion defined in the lower portion of the case 11. Then, the oil is scooped up as the ring gears 24A, 24B rotate, whereby the oil is supplied to both the plates 35, 36. In addition, whether the ring gears 24A, 24B are rotating or stay stationary, the oil is supplied to between both the plates 35, 36 by releasing the hydraulic brake 60. On the other hand, in the case where both the plates 35, 36 are in frictional engagement as a result of the ring gears 24A, 24B being fixed by applying the hydraulic brake 60, the oil scooping effect by the rotational plates 36 cannot be obtained, and hence, no oil is supplied to portions between both the plates 35, 36. In case the hydraulic brake 60 continues to be applied for a long period of time, there may be fears that a lubrication failure occurs at upper portions of the rotational plates 36.

As shown in FIGS. 4 to 10, in the rear wheel driving system 1, when the wheeled vehicle 3 is traveling, the hydraulic brake 60 remains weakly applied or normally applied excluding a situation where the wheeled vehicle 3 travels forwards at high vehicle speeds. In a driving mode depicted in FIG. 11, at the time of the EV start, the one-way clutch 50 is engaged (ON), and the hydraulic brake 60 is applied weakly, whereafter the hydraulic brake 60 is kept applied until the Wheeled vehicle 3 performs the high-speed ENG cruise. Therefore, the ring gear 24B on which the rotational plates 36 are fitted is restricted from rotating and both the plates 35, 36 are kept in frictional engagement in this period. Because of this, the oil scooping effect by the rotational plates 36 cannot be obtained. leading to fears that a lubrication failure occurs in the hydraulic brake 60. In case a lubrication failure occurs in the hydraulic brake 60, the torque transmitting function which should originally be performed by the hydraulic brake 60 cannot be exhibited, and there are fears that the hydraulic brake 60 is deteriorated.

Then, the Controller 8 has a function as a time counter configured to obtain a continuous applied time that is an elapsed time from the start of a latest application of the hydraulic brake 60 in addition to the functions of the motor controller and the connection/disconnection unit controller, and performs a forced brake release that releases the hydraulic brake 60 when a continuous applied time obtained by the time counter is equal to or greater than a predetermined time.
<Brake Release Control>

Figure 12:
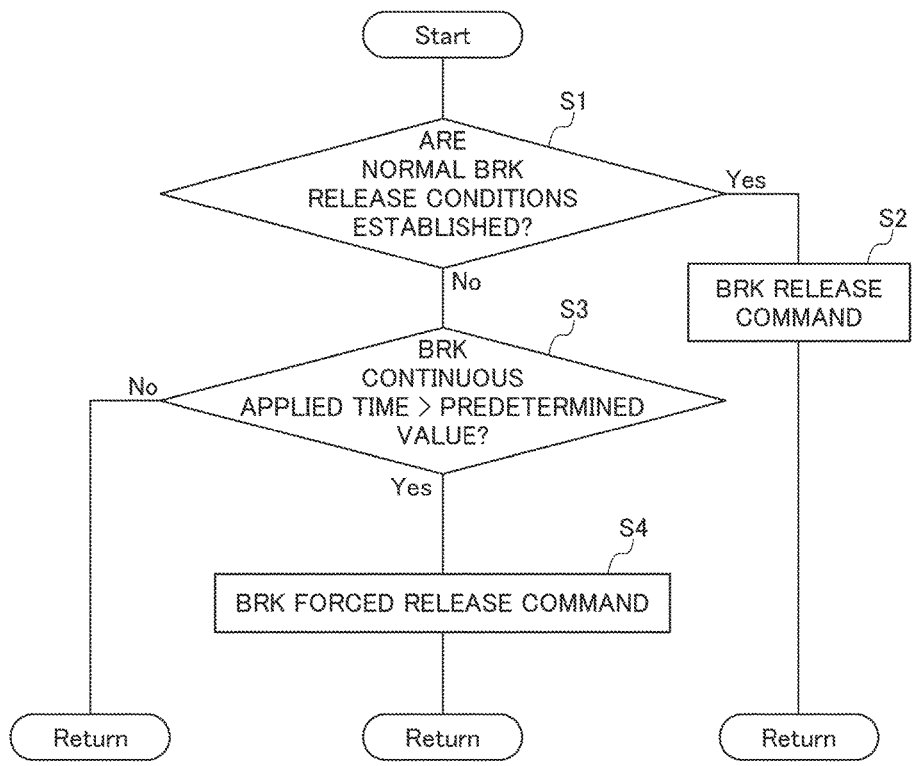
FIG. 12 is a flowchart explaining a brake release control.

Next, a brake release control of the hydraulic brake 60 including the forced brake release will be described by reference to FIG. 12.

In the brake release control of the hydraulic brake 60, firstly, whether or not normal brake release conditions are established is determined (S1). These normal brake release conditions are determined according to the traveling states of the rear wheel driving system 1 (forward traveling, reversing, vehicle speeds and the like) and are specified in advance according to the various states of the rear wheel driving system 1 which are explained in FIGS. 4 to 11. When the brake release conditions are established, a brake release command is outputted from the controller 8, and a normal brake release control to release the hydraulic brake 60 is executed immediately (S2). For example, in FIG. 11, when the driving of the wheeled vehicle is shifted from the ENG+EV acceleration in the middle vehicle speed range to the high-speed ENG cruise in the high vehicle speed range, a brake release command is outputted, whereby the hydraulic brake 60 is released.

At this time, the forward torque attempting to cause the wheeled vehicle to travel forwards acts on the planetary carriers 23A, 23B from the axle shafts 10A, 10B, and the first and second motors 2A, 2B stop the power running drive. Therefore, the forward torque acts on the ring gears 24A, 24B. When the hydraulic brake 60 is released, the fixed plates 35 and the rotational plates 36 which are in fictional engagement are separated from each other, whereby the rotational plates 36 are permitted to rotate. Then, the oil scooped up by virtue of the oil scooping effect of the rotational plates 36 is supplied to portions between the fixed plates 35 and the rotational plates 36 which are so separated, whereby the hydraulic brake 60 is lubricated. In the controller 8, the continuous applied time of the time counter is reset in association with the release of the hydraulic brake 60.

In S1, when the brake release conditions are not established, whether or not the continuous applied time obtained by the time counter is greater than the predetermined value is detected (S3). When the continuous applied time obtained by the time counter is greater than the predetermined value as a result of the detection, it is judged that there are fears that a lubrication failure is occurring in the hydraulic brake 60, and a forced release command of the hydraulic brake 60 is outputted (S4). When the continuous applied time obtained by the time counter is equal to or smaller than the predetermined value, it is judged that no lubrication failure is occurring in the hydraulic brake 60 or a lubrication failure occurring still falls within a permissible range, the brake release control is ended.
<Brake Forced Release Control for Driving through FWD>

When a forced release command of the hydraulic brake 60 is outputted from the controller 8 in the case of the wheeled vehicle 3 being driven through FWD, that is, in the case of no torque being generated by the first and second motors 2A, 2B, the front wheels Wf are being driven by the front wheel driving system 6 and the hydraulic brake 60 does not contribute to the transmission of power. Therefore, since a release within a short period of time is permitted at all times, the hydraulic brake 60 is released immediately. At this time, similar to the normal brake release control, the hydraulic brake 60 is lubricated by releasing the hydraulic brake 60.

Namely, when the continuous applied time obtained by the time counter is equal to or greater than the predetermined time in the case of the front wheel driving system 6 generating the forward torque, the controller 8 releases the hydraulic brake 60. For example, in FIG. 11, in the case of the wheeled vehicle 3 being driven through the ENG acceleration and the middle-speed ENG cruise, the hydraulic brake 60 is released immediately.

<Brake Forced Release Control for Driving through RWD or AWD>

When a forced release command of the hydraulic brake 60 is outputted from the controller 8 in the case of the wheeled vehicle 3 being driven through RWD or AWD that is, in the case of forward torque being generated by the first and second motors 2A, 2B, the controller 8 waits to release the hydraulic brake 60 until the forward torque becomes substantially zero and releases the hydraulic brake 60 at a predetermined timing (A), (B) or (C) which will be described later.

(A) At the Time of Driving through FWD

When the controller 8 releases the hydraulic brake 60 in a forced fashion after waiting until the wheeled vehicle 3 is driven through FWD, that is, a brake forced release control which is performed when the wheeled vehicle 3 is driven trough FWD is similar to the brake release control described above (<Brake Forced Release Control For Driving through FWD>, and therefore, the description, thereof will be omitted here.

(B) At the Time of Shifting to Regenerative Drive

When the rear wheel driving system 1 receives a regenerative drive command, normally, the hydraulic brake 60 is controlled to be applied immediately and the first and second motors 2A, 2B are controlled to perform a regenerative drive. However, in the case of a forced release command of the hydraulic brake 60 being outputted from the controller 8, the release of the hydraulic brake 60 is inserted before the regenerative drive of the first and second motors 2A, 2B in an interrupting fashion, and further, the first and second motors 2A, 2B are controlled to be stopped or to perform a reverse power miming drive. This enables the hydraulic brake 60 to be lubricated in a similar way to the normal brake release control by releasing the hydraulic brake 60. In the driving mode depicted in FIG. 11, although a shifting from the power running drive of the first and second motors 2A, 2B to the regenerative, drive thereof is not depicted, for example, in the case where the regeneration is performed after the EV acceleration, the hydraulic brake 60 is released when the driving of the first and second motors 2A, 2B is shifted from the power running drive to the regenerative drive thereof.

In this way, when the start of the regenerative drive of the first and second motors 2A, 2B, that is, the start of generating a braking force by the rear wheel driving system 1 is delayed, a braking force is generated from wheel brakes, not shown, or the like so as to compensate for the delay in the start of generating a regenerative drive torque from the first and second motors 2A, 2B. In this way, since the braking force can also be generated by the wheel brakes other than the first and second motors 2A, 2B, the braking force required by the whole of the wheeled vehicle can be satisfied.

Although the hydraulic brake 60 is lubricated only by stopping the first and second motors 2A, 2B when the brake is released as in the normal brake release control, since the start of the regenerative drive is waited for, it is preferable to cause the first and second motors 2A, 2B to perform a. reverse power running drive so that the lubrication is completed within a shorter period of time.

When a forced release command of the hydraulic brake 60 is outputted from the controller 8 in the case of the wheeled vehicle 3 being driven through RWD or AWD , that is, in the case of forward torque being generated by the first and second motors 2A, 2B the hydraulic brake 60 which is being weakly applied may be released for a predetermined period of time in that state. In the case of the first and second motors 2A, 2B generating the forward torque, the one-way clutch 50 is engaged, and the torque is transmitted by the one-way clutch 50. Therefore, even though the hydraulic brake 60 is released, the transmission of the torque is not affected. In this case, however, since the ring gears 24A, 24B continue to be fixed by the one-way clutch 50, the oil scooping effect by the rotational plates 36 cannot be expected, and hence, the oil is only supplied to the portions between the fixed plates 35 and the rotational plates 36 by separating the fixed plates 35 and the rotational plates 36.

(C) At the Time of Stopping

When the controller 8 releases the hydraulic brake 60 in a forced fashion after waiting until the wheeled vehicle 3 comes to a halt, that is releasing the hydraulic brake 60 while the wheeled vehicle is stopping is similar to the brake release performed when the wheeled vehicle stops normally. The fastening of the ring gears 24A, 24B by the hydraulic brake 60 is released as a result of the hydraulic brake 60 being released, and the fixed plates 35 and the rotational plates 36 are separated, whereby the oil is supplied to the portions between the fixed plates 35 and the rotational plates 36. In the case of a forced release command of the hydraulic brake 60 being outputted from the controller 8 while the wheeled vehicle is stopping, the first and second motors 2A, 2B are controlled to perform a reverse power running drive in addition to the release of the hydraulic brake 60.

When the wheeled vehicle 3 stops normally, the first and second motors 2A, 2B stop the power running drive, and the left and right rear wheels LWr, RWr also stop. Therefore, the sun gears S1, S2 which are connected to the first and second motors 2A, 2B, respectively, and the carriers C1, C2 which are connected to the left and right rear wheels LWr, RWr, respectively, also stop, and the ring gears 24A, 24B also stop rotating (refer to FIG. 5). However, when the wheeled vehicle 3 stops with the forced release command being outputted, by causing the first and second motors 2A, 2B to perform the reverse power running drive, the ring gears 24A, 24B rotate in the forward direction in such a state that the carriers C1, C2 which are connected to the left and right rear wheels LWr, RWr, respectively, stop. Therefore, the oil scooped up by virtue of the oil scooping effect by the rotational plates 36 is supplied to the portions between the fixed plates 35 and the rotational plates 36, whereby the hydraulic brake 60 is lubricated. When the wheeled vehicle 3 is stopping, compared with when the wheeled vehicle 3 is being driven, the spaces between both the plates 35, 36 have difficulty in expanding, and therefore, the oil an be supplied to the portions between both the plates 35, 36 effectively by causing the first and second motors 2A, 2B to perform the reverse power running drive. When the wheeled vehicle 3 is stopping, the one-way clutch 50 is disengaged, and therefore, no torque is outputted to the left and right rear wheels LWr, RWr. However, it is more preferable to apply the wheel brakes, not shown, when the first and second motors 2A, 2B perform the reverse power running drive.

In the embodiment, the rear wheel driving system 1 has been exemplified in which the one-way clutch 50 and the hydraulic brake 60 are provided in parallel on the power transmission path between the first and second motors 2A, 2B and the rear wheels Wr. However, the one-way clutch 50 is not always necessary, and hence, the invention can also be applied to a driving system in Which only the hydraulic brake 60 is provided on the power transmission path between the first and second motors 2A, 2B and the rear wheels Wr, that is, a driving system in which a connection/disconnection unit is provided on a power transmission path between a drive source and a driven portion. In this case, without considering whether the one-way clutch 50 is engaged or disengaged, a so-called torque loss can be prevented in which no torque can be transmitted by releasing the hydraulic brake 60 with no torque generated from the first and second motors 2A, 2B.

Thus, as has been described heretofore, according to the embodiment, the controller 8 has the function as the time counter to obtain the continuous applied time which is an elapsed time from the start of the latest application of the hydraulic brake 60 in addition to the functions as the motor controller and the connection/disconnection unit controller, and therefore, the controller 8 can control the release of the hydraulic brake 60 based on the obtained continuous applied time, whereby the controller 8 can protect the hydraulic brake 60 appropriately in addition to realization of the basic function of the hydraulic brake 60 of transmitting the torque.

In addition, the extension of the continuous applied time of the hydraulic brake 60 can be prevented by releasing the hydraulic brake 60 when the continuous applied time obtained by the time counter is equal to or greater than the predetermined time, and the oil can be supplied to the portions between the multiple plates of the hydraulic brake 60 in association with the release of the hydraulic brake 60.

The invention is not limited to the embodiment that has been described heretofore and hence can be modified or improved as required.

Although the hydraulically driven wet multiple disc type brake is exemplified as the connection/disconnection unit, the invention is not limited thereto, and hence, a mechanically driven or electromagnetically driven wet multiple disc type brake can be selected arbitrarily.

Although the first and second motors 2A, 2B are connected to the sun gears 21A, 21B and the ring gears are connected together, the invention is not limited thereto, and hence, sun gears may be connected together with the first and second motors connected to the ring gears.

Although the connection/disconnection unit and the unidirectional power transmitting unit are disposed on one of the three elements which make up a differential unit, the invention is not limited thereto, and hence, the connection/disconnection unit and the unidirectional power transmitting unit may be disposed on a simple power transmitting portion between a rotary member and a rotary member.

The two drive sources do not have to be provided, and hence, a mechanism may be provided in which a driven portion is driven by one drive source.

The front wheel driving system may be such that a drive source uses a motor as a single drive source without using an internal combustion engine.

Other power generating units such as an internal combustion engine may be used as a power supply in place of the motors.

The application of the driving system of the invention is not limited to the wheeled vehicle, and hence, the driving system of the invention may be applied to vessels or aircraft, for example.

This patent application is based on the Japanese Patent Application (No. 2013-265802) filed on Dec. 24, 2013, the contents of which are incorporated herein by reference.

DESCRIPTION OF REFERENCE NUMERALS AND CHARACTERS

1 rear wheel driving system (driving system)
2A first motor (drive source)
2B second motor (drive source)
3 wheeled vehicle (vehicle)
4 internal combustion engine (another drive source)
5 motor (another drive source)
8 controller (connection/disconnection controller, time counter)
50 one-way clutch (unidirectional power transmitting unit)
60 hydraulic brake (connection/disconnection unit)
Wf front wheel (second drive wheel)
Wr rear wheel (driven portion, first drive wheel)

The invention claimed is:

1. A driving system for a vehicle, comprising:
a drive source;
a driven portion, which is driven by the drive source to propel the vehicle;
a wet multiple disc connection/disconnection unit, which is provided on a power transmission path between the drive source and the driven portion, and which is configured to put the power transmission path in a disconnected state or in a connected state by being released or applied; and
a connection/disconnection unit controller, which is configured to control a release and an application of the connection/disconnection unit, wherein
the driving system further comprises a time counter, which is configured to obtain a continuous applied time that is an elapsed time from a start of a latest application of the connection/disconnection unit,
the connection/disconnection unit controller releases the connection/disconnection unit when the continuous applied time obtained by the time counter is equal to or greater than a predetermined time,
the driving system further comprises a unidirectional power transmitting unit, which is provided in parallel to the connection/disconnection unit on the power transmission path between the drive source and the driven portion, and which is configured so that the unidirectional power transmitting unit is engaged when a rotational power of a drive source side in one direction is inputted into a driven portion side, is disengaged when a rotational power of the drive source side in the other direction is inputted into the driven portion side, is disengaged when a rotational power of the driven portion side in the one direction is inputted into the drive source side, and is engaged when a rotational power of the driven portion side in the other direction is inputted into the drive source side, and
when the continuous applied time obtained by the time counter is equal to or greater than the predetermined time in a case of the drive source generating the rotational power in the one direction, the connection/ disconnection unit controller waits to release the connection/disconnection unit until the rotational power in the one direction becomes substantially zero.

2. The driving system for the vehicle according to claim 1, wherein when the rotational power in the one direction of the drive source side is inputted into the driven portion side, the connection/disconnection unit controller applies the connection/disconnection unit so that the drive source side and the driven portion side are put in a connected state.

3. A driving system for a vehicle, comprising:
a drive source;
a driven portion, which is driven by the drive source to propel the vehicle;
a wet multiple disc connection/disconnection unit, which is provided on a power transmission path between the drive source and the driven portion, and which is configured to put the power transmission path in a disconnected state or in a connected state by being released or applied; and
a connection/disconnection unit controller, which is configured to control a release and an application of the connection/disconnection unit, wherein
the driving system further comprises a time counter, which is configured to obtain a continuous applied time that is an elapsed time from a start of a latest application of the connection/disconnection unit,
the connection/disconnection unit controller releases the connection/disconnection unit when the continuous applied time obtained by the time counter is equal to or greater than a predetermined time,
the driving system further comprises a unidirectional power transmitting unit, which is provided in parallel to the connection/disconnection unit on the power transmission path between the drive source and the driven portion, and which is configured so that the unidirectional power transmitting unit is engaged when a rotational power of a drive source side in one direction is inputted into a driven portion side, is disengaged when a rotational power of the drive source side in the other direction is inputted into the driven portion side, is disengaged when a rotational power of the driven portion side in the one direction is inputted into the drive source side, and is engaged when a rotational power of the driven portion side in the other direction is inputted into the drive source side, and
when the continuous applied time obtained by the time counter is equal to or greater than the predetermined time in a case of the drive source generating the rotational power in the one direction, the connection/disconnection unit controller continues to apply the connection/disconnection unit until a command to the drive source is switched to an instruction of generating the rotational power in the other direction, and releases the connection/disconnection unit after the power source has finished generating the rotational power in the one direction and before the power source starts generating the rotational power in the other direction.

4. The driving system for the vehicle according to claim 3, wherein:
the vehicle is a wheeled vehicle;
the driven portion is a wheel of the wheeled vehicle;
the wheeled vehicle includes a brake unit that brakes a rotation of the wheel; and
when the connection/disconnection unit is released before the drive source starts generating the rotational power in the other direction, the brake unit is caused to generate a braking force that complements the rotational power in the other direction so as to compensate for a delay in a start of generating the rotational power in the other direction.

5. The driving system for the vehicle according to claim 3, wherein when the rotational power in the one direction of the drive source side is inputted into the driven portion side, the connection/disconnection unit controller applies the connection/disconnection unit so that the drive source side and the driven portion side are put in a connected state.

6. A driving system for a vehicle, comprising:
a drive source;
a driven portion, which is driven by the drive source to propel the vehicle;
a wet multiple disc connection/disconnection unit, which is provided on a power transmission path between the drive source and the driven portion, and which is configured to put the power transmission path in a disconnected state or in a connected state by being released or applied; and
a connection/disconnection unit controller, which is configured to control a release and an application of the connection/disconnection unit, wherein
the driving system further comprises a time counter, which is configured to obtain a continuous applied time that is an elapsed time from a start of a latest application of the connection/disconnection unit,
the connection/disconnection unit controller releases the connection/disconnection unit when the continuous applied time obtained by the time counter is equal to or greater than a predetermined time,
the vehicle is a wheeled vehicle,
the driven portion is a first drive wheel, which is either one of a front wheel and a rear wheel that are wheels of the wheeled vehicle,
the wheeled vehicle includes another drive source, which is configured to drive a second drive wheel that is an other of the front wheel and the rear wheel, and
when the continuous applied time obtained by the time counter is equal to or greater than a predetermined time in a case of the another drive source generating the rotational power in one direction, the connection/disconnection unit controller releases the connection/disconnection unit.

7. A driving system for a vehicle, comprising:
a drive source;
a driven portion, which is driven by the drive source to propel the vehicle;
a wet multiple disc connection/disconnection unit, which is provided on a power transmission path between the drive source and the driven portion, and which is configured to put the power transmission path in a disconnected state or in a connected state by being released or applied; and
a connection/disconnection unit controller, which is configured to control a release and an application of the connection/disconnection unit, wherein
the driving system further comprises a time counter, which is configured to obtain a continuous applied time that is an elapsed time from a start of a latest application of the connection/disconnection unit,
the connection/disconnection unit controller releases the connection/disconnection unit when the continuous applied time obtained by the time counter is equal to or greater than a predetermined time, and
when the time counter obtains a continuous applied time that is equal to or greater than the predetermined time in a case of the vehicle moving, the connection/disconnection unit controller waits to release the connection/
disconnection unit until the vehicle stops.

8. The driving system for the vehicle according to claim 7, wherein:
the vehicle is a wheeled vehicle;
the driven portion is a wheel of the wheeled vehicle;
the wheeled vehicle comprises a brake unit, which brakes a rotation of the wheel; and
when the wheeled vehicle stops and the connection/disconnection unit is released, the drive source is caused to generate a power and the brake unit is activated to operate.

* * * * *